(12) United States Patent
Neubrand

(10) Patent No.: US 6,899,368 B2
(45) Date of Patent: May 31, 2005

(54) DECKLID MECHANISM FOR VEHICLE WITH RETRACTABLE TOP

(75) Inventor: Frank Neubrand, West Bloomfield, MI (US)

(73) Assignee: Wilhelm Karmann GmbH, Osnabruck (DE)

( * ) Notice: Subject to any disclaimer, the term of this patent is extended or adjusted under 35 U.S.C. 154(b) by 0 days.

(21) Appl. No.: 10/443,635

(22) Filed: May 22, 2003

(65) Prior Publication Data

US 2003/0218350 A1 Nov. 27, 2003

Related U.S. Application Data

(60) Provisional application No. 60/463,817, filed on Apr. 18, 2003, and provisional application No. 60/382,662, filed on May 23, 2002.

(51) Int. Cl.[7] ............................................. B62D 25/10
(52) U.S. Cl. ................ 296/76; 296/136.06; 296/107.08
(58) Field of Search ............................. 296/76, 107.08, 296/136.01, 136.04, 136.05, 136.06, 193.11; 180/89.17

(56) References Cited

U.S. PATENT DOCUMENTS

| | | | |
|---|---|---|---|
| 1,253,641 A | 1/1918 | Steele | 16/222 |
| 1,774,199 A | 8/1930 | Good | 296/76 |
| 1,933,623 A | 11/1933 | Gordon | 296/76 |
| 2,181,869 A | 12/1939 | Carr | 296/107.2 |
| 2,947,570 A | 8/1960 | Noe | 296/117 |
| 3,021,174 A | 2/1962 | Rund | 296/107.2 |
| 3,180,677 A | 4/1965 | Scott | 296/107.2 |
| 4,650,241 A | 3/1987 | Motonami et al. | 296/203.03 |
| 5,520,432 A | 5/1996 | Gmeiner et al. | 296/107.01 |
| 5,551,743 A | 9/1996 | Klein | 296/76 |
| 5,649,733 A | 7/1997 | Seel et al. | 296/37.5 |
| 5,655,331 A | 8/1997 | Schrader et al. | 49/280 |
| 5,746,470 A | 5/1998 | Seel et al. | 296/108 |

(Continued)

FOREIGN PATENT DOCUMENTS

| | | |
|---|---|---|
| DE | 19746569 A1 | 5/1999 |
| DE | 19851181 A1 | 11/1999 |
| JP | 5 112256 | 5/1993 |
| JP | 2003104062 A2 | 4/2003 |

Primary Examiner—Patricia L. Engle
(74) Attorney, Agent, or Firm—Gifford, Krass, Groh, Sprinkle, Anderson & Citkowski, PC

(57) ABSTRACT

An articulating decklid system for a vehicle with a retractable roof includes a first linkage member with a forward end pivotally interconnected with the vehicle body and a rearward end spaced therefrom. A decklid has a forward end and a rearward end, with the rearward end being pivotally connected to the rearward end of the first linkage member. A second linkage assembly has an upper end pivotally interconnected with the decklid and a lower end pivotally interconnected with the first linkage member between its forward and rearward ends. The second linkage assembly has a folded and an unfolded position. The system also includes an actuator. The system has a closed position with the rearward ends of the first linkage member and decklid adjacent the rearward end of the luggage compartment, the second linkage assembly folded, and the forward end of the decklid adjacent the forward end of the luggage compartment. The system has a top receiving position wherein the rearward ends of the first linkage member and the decklid are adjacent the rearward end of the luggage compartment, the second linkage assembly is unfolded, and the forward end of the decklid is spaced from the vehicle body. The system has a luggage receiving position wherein the rearward ends of the first linkage member and the decklid are spaced from the rearward end of the luggage compartment, the second linkage assembly is unfolded, and the forward end of the decklid is spaced from the forward end of the luggage compartment.

51 Claims, 7 Drawing Sheets

U.S. PATENT DOCUMENTS

| | | | |
|---|---|---|---|
| 5,765,895 A | 6/1998 | Rose | 296/76 |
| 5,775,766 A | 7/1998 | Schaible | 296/107.09 |
| 5,823,606 A | 10/1998 | Schenk | 296/107.8 |
| 5,944,378 A | 8/1999 | Mather et al. | 296/219 |
| 5,967,591 A | 10/1999 | Muehlhausen | 296/107.16 |
| 5,967,593 A | 10/1999 | Schuler | 296/136.06 |
| 6,010,178 A | 1/2000 | Hahn | 296/107.08 |
| 6,062,628 A | 5/2000 | Guillez | 296/107.08 |
| 6,073,988 A | 6/2000 | Huber | 296/116 |
| 6,092,335 A | 7/2000 | Queveau | 49/192 |
| 6,123,381 A | 9/2000 | Schenk | 296/107.07 |
| 6,145,915 A | 11/2000 | Queveau | 296/107.08 |
| 6,164,713 A | 12/2000 | Graf | 296/107.08 |
| 6,186,577 B1 | 2/2001 | Guckel | 296/107.07 |
| 6,193,300 B1 | 2/2001 | Nakatomi | 296/107.08 |
| 6,217,104 B1 | 4/2001 | Neubrand | 296/108 |
| 6,250,707 B1 | 6/2001 | Dintner | 296/76 |
| 6,257,648 B1 | 7/2001 | Schenk | 296/107.07 |
| 6,270,144 B1 | 8/2001 | Schenk | 296/107.08 |
| 6,296,295 B1 | 10/2001 | Jambor et al. | 296/107.7 |
| 6,325,445 B1 | 12/2001 | Schenk | 296/107.08 |
| 6,352,298 B1 | 3/2002 | Hayashi | 296/107.08 |
| 6,357,815 B1 | 3/2002 | Queveau | 296/76 |
| 6,464,282 B2 | 10/2002 | Ellermann | 296/70 |
| 6,511,118 B2 | 1/2003 | Liedmeyer | 296/107.17 |
| 6,572,157 B2 | 6/2003 | Kaute | 292/201 |
| 6,578,899 B2 | 6/2003 | Hasselgruber | 296/107.08 |
| 6,585,307 B1 | 7/2003 | Queveau | 296/76 |
| 6,595,572 B2 | 7/2003 | Schuler et al. | 296/107.08 |
| 6,604,775 B2 | 8/2003 | Obendiek | 296/108 |
| 6,619,720 B2 | 9/2003 | Necastri | 296/107.08 |
| 2002/0093218 A1 | 7/2002 | Weissmueller | 296/107.08 |
| 2002/0109372 A1 | 8/2002 | Weissmueller | 296/107.08 |
| 2003/0020300 A1 | 1/2003 | Zipperle | 296/136.05 |
| 2003/0025350 A1 | 2/2003 | Sande | 296/107.08 |

DECKLID MECHANISM FOR VEHICLE WITH RETRACTABLE TOP

REFERENCE TO RELATED APPLICATIONS

This application claims priority to U.S. provisional patent application Ser. Nos. 60/382,662, filed May 23, 2002 and 60/463,817, filed Apr. 18, 2003, both of which are incorporated herein in their entirety by reference.

FIELD OF THE INVENTION

The present invention relates generally to vehicles with retractable roof structures and, more specifically, to a system for articulating a vehicle decklid to either a top receiving position or a luggage receiving position.

BACKGROUND OF THE INVENTION

Most vehicles have rigid roof structures that permanently extend over and cover the passenger compartment. Manufacturers also provide a variety of designs that offer the vehicle operator the opportunity to partially or completely uncover the passenger compartment. Sunroofs and moon roofs are some of the simplest designs, and offer the opportunity to open a portion of the vehicle roof for increased airflow. More complicated designs allow the entire roof structure to be retracted and stored behind the passenger compartment. When retracted, these roof designs form a roof stack to the rear of the passenger compartment. In some designs, a storage area is provided just rearwardly of the passenger compartment and forwardly of the vehicle luggage compartment. A soft or hard cover is sometimes provided for covering the roof stack in the stored position. In other designs, the retracted roof is stored in the vehicle luggage compartment. This approach is especially useful with retractable hard top designs. In one approach, the vehicle has a decklid that articulates rearwardly to provide a forward facing opening behind the passenger compartment to receive the retracted roof structure. The decklid may then be articulated back into the closed position to cover the top stack. This gives the vehicle a finished appearance when the roof is retracted. Most consumers prefer that the trunk also be usable in a traditional manner, wherein the rear end of the decklid opens to provide a rearwardly facing opening to receive luggage or groceries. Providing a decklid that will articulate so as to provide a forward-facing opening to receive a retractable roof structure and to also open in a traditional manner to provide a rearward facing opening presents numerous mechanical challenges.

One approach to providing an articulated decklid that opens both rearwardly and forwardly, is to provide a frame which supports the decklid and provides for interconnection with the body. The frame typically articulates with the decklid when it moves in one direction and remains stationary when the decklid articulates in the other direction. The decklid then latches and pivots with respect to the frame in some positions. Examples of designs using a frame are illustrated in the following patents: U.S. Pat. Nos.'s 5,775,766, 5,823,606, 6,010,178, 6,164,713, 6,186,577, 6,270,144, 6,325,445, and U.S. Patent Publication No. 2003/0020300 A1. Designs with frames, while functional, add significant cost and weight to vehicle designs. An alternative approach has been to provide frameless decklid designs. However, these designs typically include a complicated articulation mechanism that remains attached to both the decklid and the body in all positions of the decklid. Examples of these systems are shown in the following patents: U.S. Pat. Nos.'s 6,193,300 and 6,352,298, and U.S. Patent Publication No. 2002/0093218. As will be appreciated by those of skill in the art, these systems are very complicated and the articulation mechanisms are heavy and expensive. In light of this, there remains a need for improved decklid articulation systems.

SUMMARY OF THE INVENTION

The present invention provides an improved articulating decklid system design. The decklid system is designed for a vehicle with a body and a retractable roof selectively covering a passenger compartment disposed in the body. The vehicle has a luggage storage compartment positioned rearward of the passenger compartment and disposed in the body. The luggage compartment has a forward end and a rearward end. The system includes a first linkage member having a forward end pivotally interconnected with the vehicle body and a rearward end spaced therefrom. The decklid has a forward end and a rearward end. The rearward end is pivotally interconnected with the rearward end of the first linkage member. A second linkage assembly has an upper end pivotally interconnected with the decklid and a lower end pivotally interconnected with the first linkage member between the forward and rearward ends. The second linkage assembly has a folded position wherein the upper end and the lower end are separated by a first distance and an unfolded position wherein the upper and lower ends are separated by a distance greater than the first distance. An actuator is operable to move the second linkage between the folded and unfolded positions. The decklid system also includes an actuator. The decklid system has a first closed position wherein the rearward ends of the first linkage member and the decklid are adjacent the rearward end of the luggage compartment, the second linkage assembly is in the folded position, and the forward end of the decklid is adjacent the forward end of the luggage compartment. The decklid system has a second top receiving position wherein the rearward ends of the first linkage member and the decklid are adjacent the rearward end of the luggage compartment, the second linkage assembly is in the unfolded position, and the forward end of the decklid is spaced from the vehicle body so as to define a generally forward facing opening to receive the retractable roof therethrough. The decklid system has a third luggage receiving position wherein the rearward end of the first linkage member and the decklid are spaced from the rearward end of the luggage compartment so as to define a generally rearward facing opening to receive luggage therethrough. In the luggage receiving position, the second linkage assembly is in the unfolded position, and the forward end of the decklid is spaced from the forward end of the luggage compartment.

DETAILED DESCRIPTION OF THE PREFERRED EMBODIMENTS

Figure 1:
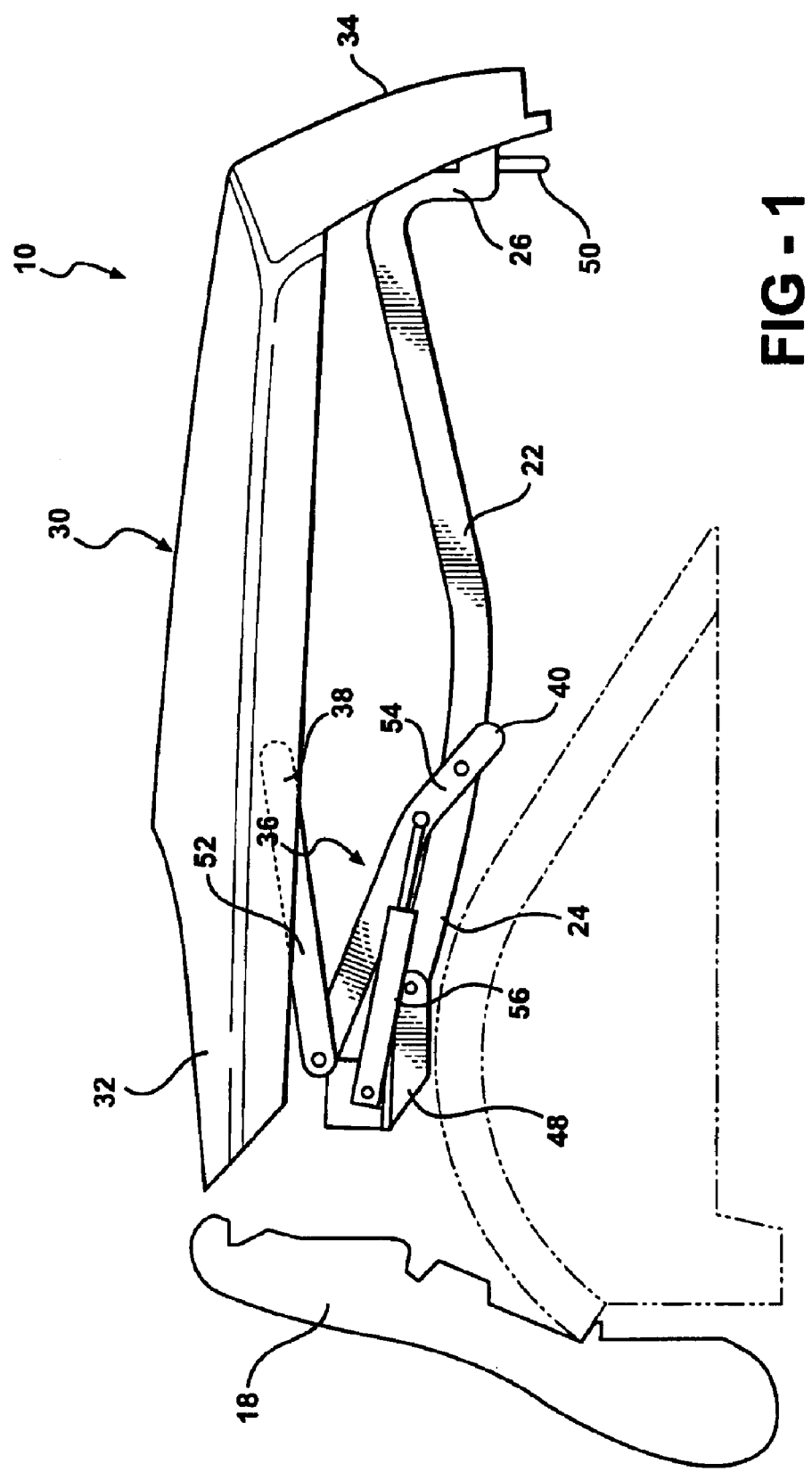
FIG. 1 is a side-elevational view of a portion of a vehicle with an articulating decklid system according to the present invention in a closed position.

Referring to FIGS. 1–4, a first embodiment of an articulating decklid system according to the present invention is generally shown at 10. The system is designed for use with a vehicle having a body 12 and a retractable roof 14 that selectively covers a passenger compartment 16 in the body 12. A seatback is shown at 18, to illustrate the rearmost portion of the passenger compartment 16. A luggage compartment 20 is defined in the vehicle body rearwardly of the passenger compartment 16.

The articulating decklid system 10 is designed for use with a retractable roof 14 which, when retracted, is stowed in the luggage compartment 20. Therefore, the decklid system 10 must provide an opening to the luggage compartment 20 for the retractable top 14 to pass through.

The articulating decklid system 10 includes a first linkage member 22 that has a forward end 24 pivotally interconnected with the vehicle body and a rearward end 26. A decklid 30 has a forward end 32 and a rearward end 34. The rearward end 34 of the decklid is pivotally interconnected with the rearward end 26 of the first linkage member 22.

Figure 2:
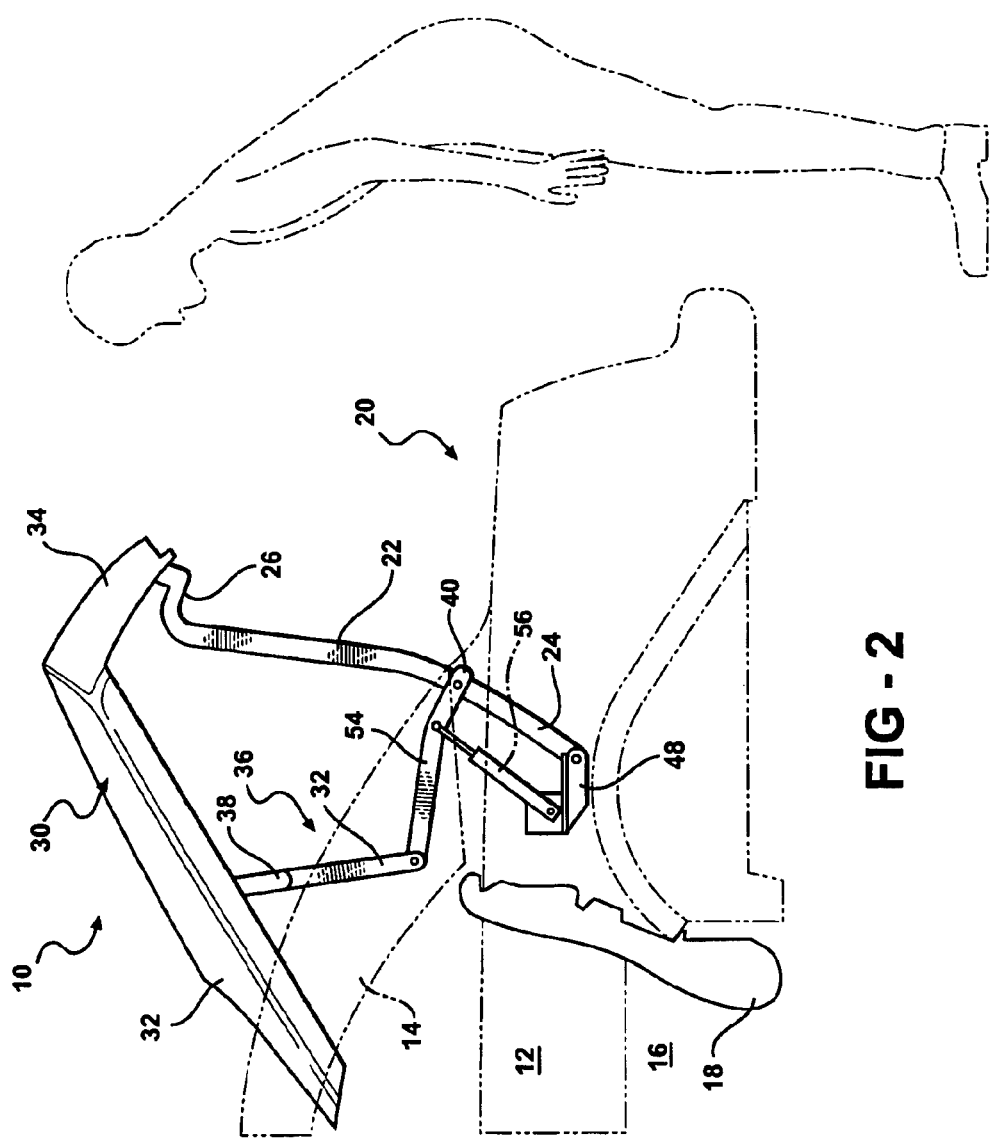
FIG. 2 is a side-elevational view of a portion of a vehicle with the articulating decklid system of FIG. 1 in a luggage receiving position.
Figure 3:
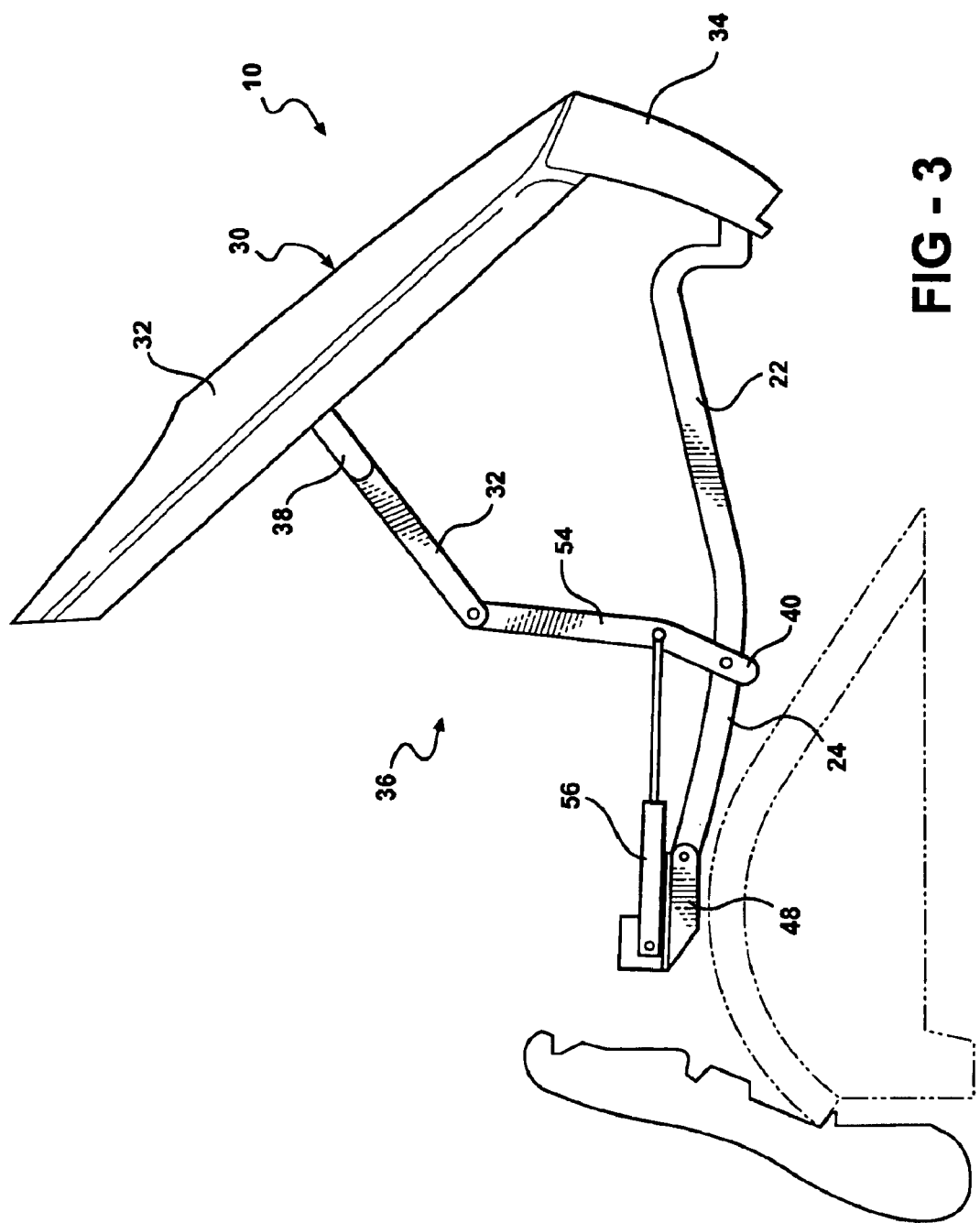
FIG. 3 is a side-elevational view of a portion of a vehicle with the articulating decklid system of FIGS. 1 and 2 in a top receiving position.

A second linkage assembly 36 has an upper end 38 pivotally interconnected with the decklid 30 and a lower end 40 pivotally interconnected with the first linkage member 22 between the forward and rearward ends 24 and 26. The second linkage assembly 36 has a folded position, shown in FIG. 1, wherein the upper end 38 and lower end 40 are separated by a short distance. The second linkage assembly also has an unfolded position, shown in FIGS. 2–4, wherein the upper end 38 and lower end 40 are separated by a larger distance. It should be noted that the unfolded positions of FIGS. 2 and 3 are actually somewhat different, since the decklid 30 is in different positions, and that the upper end 38 and lower end 40 may not be separated by the same distance in both of these unfolded positions. However, they will both be referred to as unfolded positions herein.

FIG. 1 illustrates the decklid system 10 in a closed position. In this position, the rearward ends 26 and 34 of the first linkage member and the decklid are adjacent the rearward end of the luggage compartment 20, the second linkage assembly 36 is in the folded position, and the forward end 32 of the decklid 30 is adjacent the forward end of the luggage compartment. It should be noted that when portions of the decklid system are referred to as being adjacent certain portions of the luggage compartment, they may also be considered to be adjacent corresponding portions of the vehicle body.

FIG. 2 illustrates the decklid system in a luggage receiving position, wherein a rearwardly facing opening is provided to receive luggage into the luggage compartment 20. As shown, in the luggage receiving position, the rearward ends, 26 and 34, of the first linkage member 22 and decklid 30 are spaced from the rearward end of the luggage compartment and the vehicle body. The angular movement of the first linkage member 22 also causes the second linkage assembly 36 to move to the unfolded position such that the decklid 30 articulates upwardly and forwardly. This also moves the forward end 32 of the decklid 30 to a position spaced from the forward end of the luggage compartment and the vehicle body.

FIG. 3 illustrates the decklid system in a top receiving position, wherein a forwardly facing opening is provided for the passage of the retractable roof or top therethrough. In the top receiving position, the rearward ends, 26 and 34, of the first linkage member 22 and decklid 30 are adjacent the rearward end of the luggage compartment and the vehicle body. The second linkage assembly 36 is moved to the unfolded position, thereby rotating the decklid 30 upwardly and rearwardly. Therefore, the forward end 32 of the decklid 30 is spaced from the forward end of the luggage compartment and from the vehicle body.

Figure 4:
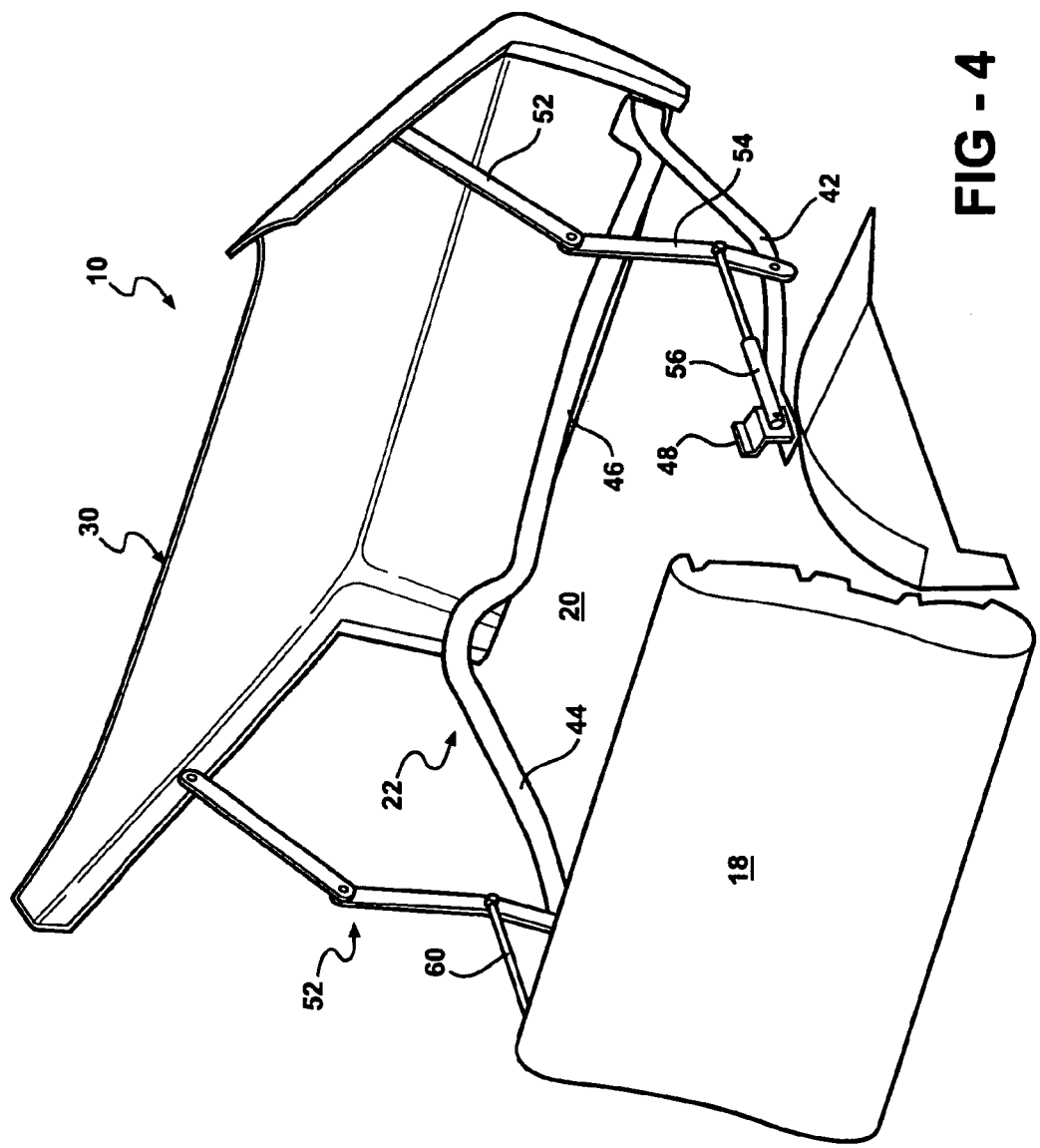
FIG. 4 is a perspective view of the decklid system of FIGS. 1–3, with the decklid in the top receiving position.

Referring to FIG. 4, the first linkage member 22 is preferably a generally U-shaped member having a pair of spaced apart side portions 42 and 44. The side portions 42 and 44 preferably extend longitudinally along the sides of the luggage compartment 20. The side portions 42 and 44 have forward ends that are pivotally connected to the vehicle body and define the forward end of the first linkage member 22. The first linkage member 22 also includes a connecting portion 46 that extends transversely between the rearward ends of the side portions 42 and 44. This connecting portion defines the rearward end of the linkage member 22. As shown, the forward end of the first linkage member 22 is pivotally connected to the vehicle body via brackets, one of which is shown at 48. Preferably, the pivotal interconnection between the first linkage member 22 and the brackets 48 is a simple pivot that defines a pivot axis. Alternatively, a more complicated pivoting mechanism, such as a four-bar or six-bar linkage, may be provided. Such an arrangement is considered a pivotal interconnection for the purposes of the present invention. The rearward end 26 of the first linkage member 22 is preferably latched to the vehicle body using a latch 50, shown in FIG. 1. This latch 50 may take the form of a traditional trunk latch, or other types of latches may be used. One centrally located latch on the connecting portion 46 is preferred, though multiple latches or latches in different positions may be used. For example, latches may be provided for connecting the side portions 42 and/or 44 to the vehicle body.

The decklid 30 is preferably interconnected with the connecting portion 46 of the first linkage member 22 by a simple pivot. However, more complex pivotal interconnections, such as four or six-bar linkages, may be used. For purposes of the present invention, these fall within the definition of a pivotal interconnection. In the illustrated embodiment, the simple pivotal connection between the first linkage member 22 and the decklid 30 causes a portion of the rearward end 34 of the decklid to move downwardly as it pivots, as shown in FIG. 3. A more complex pivotal interconnection may change this motion profile. Alternatively, the location of the pivot may be changed so as to change the motion profile.

The second linkage assembly 36 may take a variety of forms, but preferably includes an upper link 52 and a lower link 54 that are pivotally interconnected to one another. The upper end of the upper link 52 is pivotally interconnected with the decklid 30 adjacent one of its sides, while the lower end of the lower link 54 is pivotally interconnected with the corresponding side portion 42 of the first linkage member 22. An actuator 56 has one end pivotally interconnected with the vehicle body, as represented by bracket 48, and the other end pivotally interconnected with the lower link 54 between its upper and lower ends.

The actuator 56 is preferably a hydraulic linear actuator, but may alternatively be a different type of actuator. The actuator 56 has a retracted position, shown in FIGS. 1 and 2, and an extended position shown in FIGS. 3 and 4. As shown, the pivotal interconnection between the actuator 56 and the body is preferably forward of the pivotal interconnection between the first linkage member 22 and the vehicle body. The actuator 56 is also preferably lockable in its retracted position, such as in FIG. 1. By locking the actuator 56, the decklid 30 is retained in the closed position. Preferably, no other latch is provided between the forward portion of the decklid and the vehicle body.

When the decklid system 10 is moved between the closed position of FIG. 1 and the luggage receiving position of FIG. 2, the actuator 56 is retained in its retracted position. In this situation, the vehicle body, represented by bracket 48, the actuator 56, the first linkage bar 22, and the lower link 54 form a four-bar linkage. As the first linkage member 22 rotates counter-clockwise, as shown in FIG. 2, this causes the second linkage assembly 36 to move to the unfolded position, thereby moving the forward end 32 of the decklid 30 upwardly and forwardly. This causes the decklid to move up over the vehicle top 14, but also to be move forwardly sufficiently to provide access to the luggage compartment.

The decklid system 10 may be moved from the closed position of FIG. 1 to the top receiving position of FIGS. 3 and 4 by extending the actuator 56, while maintaining the first linkage member 22 in its original position, in which its rearward end may be latched to the body. This causes the decklid 30 to pivot about the pivotal interconnection between the rearward end 26 of the first linkage member and the rearward end 34 of the decklid 30. The second linkage assembly 36 is moved to its unfolded position by the movement of the actuator 56.

Referring to FIG. 4, the second linkage assembly previously discussed is illustrated as being on one side of the vehicle. Preferably, an additional linkage assembly, referred to as a third linkage assembly, is provided on the other side of the vehicle, as shown at 58. A corresponding actuator 60 is also provided. These are preferably identical to the linkage assembly and actuator on the other side of the vehicle.

Figure 5:
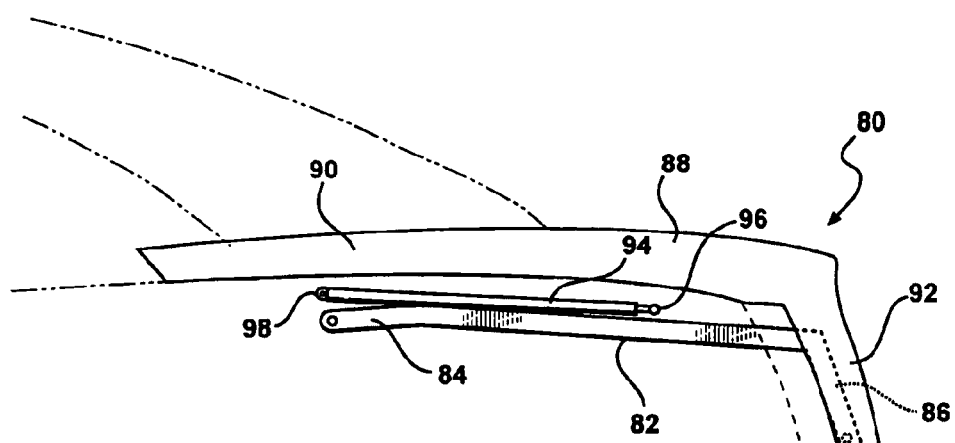
FIG. 5 is a side-elevational view of a portion of a vehicle with an articulating decklid system according to a second embodiment of the present invention in a closed position.
Figure 6:
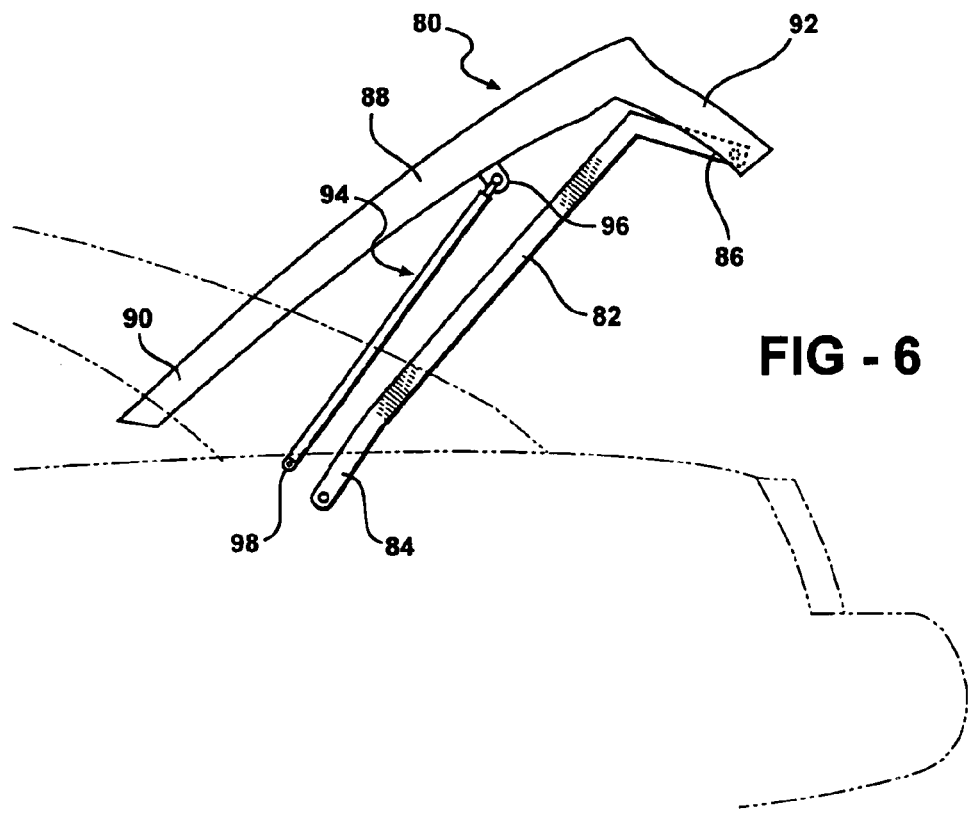
FIG. 6 is a side-elevational view of the vehicle and decklid of FIG. 5, with the decklid in the luggage receiving position.
Figure 7:
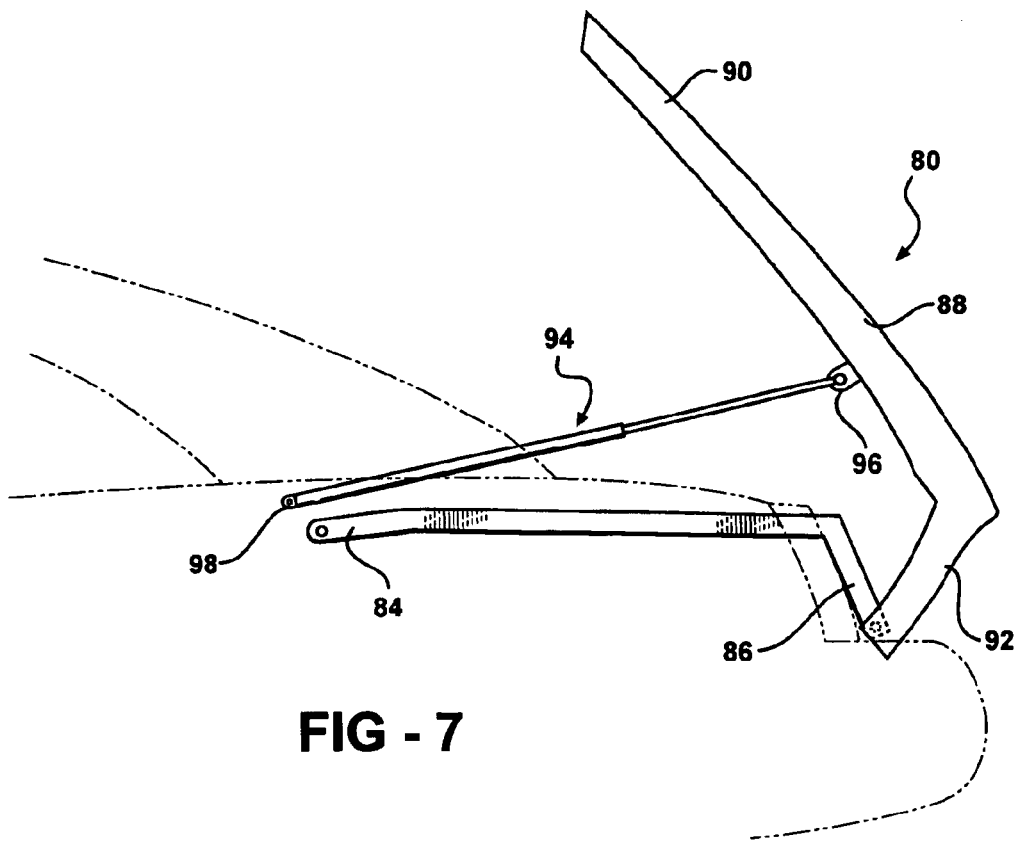
FIG. 7 is a side-elevational view of the vehicle and decklid of FIGS. 5 and 6, with the decklid in the top receiving position.

Referring now to FIGS. 5–7, a second embodiment of an articulating decklid system according to the present invention is generally shown at 80. The system includes a first linkage member 82 with a forward end 84 pivotally interconnected with the vehicle body and a rearward end 86. A decklid 88 has a forward end 90 and a rearward end 92. The rearward end 92 is preferably pivotally interconnected with the rearward end 86 of the first linkage member 82. As with the prior embodiment, the first linkage member 82 is preferably U-shaped, and the pivots between the first linkage member and the vehicle body and the decklid are preferably simple pivots. Also, there is preferably a latch provided between the rearward end 86 of the first linkage member and the vehicle body.

An actuator 94 has a first end 96 pivotally interconnected to the decklid 88 and a second end 98 pivotally interconnected to the vehicle body. The actuator 94 is preferably a hydraulic actuator, but may also be a different type of linear actuator. The actuator 94 has a retracted position, shown in FIG. 5, and an extended position shown in FIG. 7. As shown, the pivotal interconnection between the forward end 98 of the actuator 94 is preferably forward of the pivotal interconnection between the forward end 84 of the first linkage member 82 and the vehicle body. The pivotal interconnection between the first end 96 of the actuator 94 and the decklid 88 is preferably a significant distance rearward. In the illustrated embodiment, the pivotal interconnection is more than halfway back the decklid 88. In the illustrated embodiment, the actuator 94 has both of its ends positioned above the first linkage member 82. When the decklid system 80 moves from the closed position of FIG. 5 to the luggage receiving position of FIG. 6, the actuator 94 is retained in the shortened position and serves as one link in a four-bar linkage. Therefore, the decklid 80 articulates upwardly and forwardly as it rotates counterclockwise as viewed in FIG. 6. The actuator 94 is preferably lockable in its retracted position so that it serves as a link. To move the decklid system 80 from the closed position of FIG. 5 to the top receiving position of FIG. 7, the actuator 94 is moved to its extended position, which causes the decklid 88 to rotate clockwise, as shown.

Figure 8:
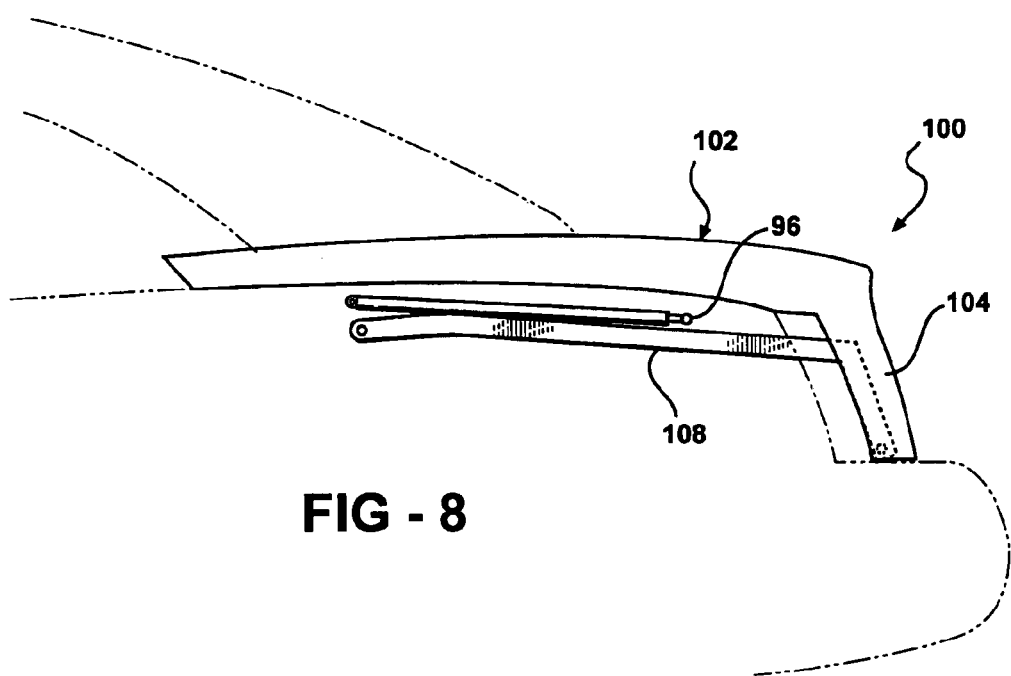
FIG. 8 is a side-elevational view of a portion of a vehicle and an articulating decklid system according to a third embodiment of the present invention, with the decklid in the closed position.
Figure 9:
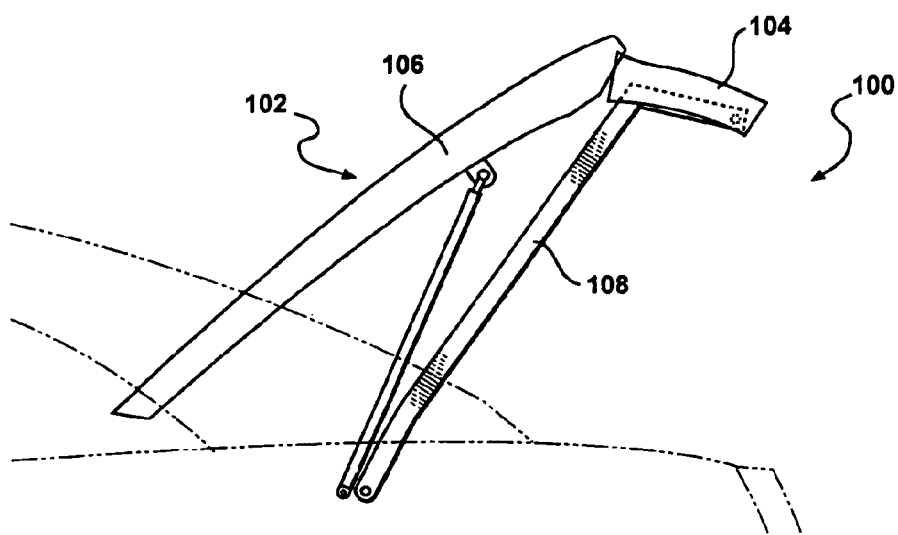
FIG. 9 is a side-elevational view similar to FIG. 8, with the decklid system in a luggage receiving position.
Figure 10:
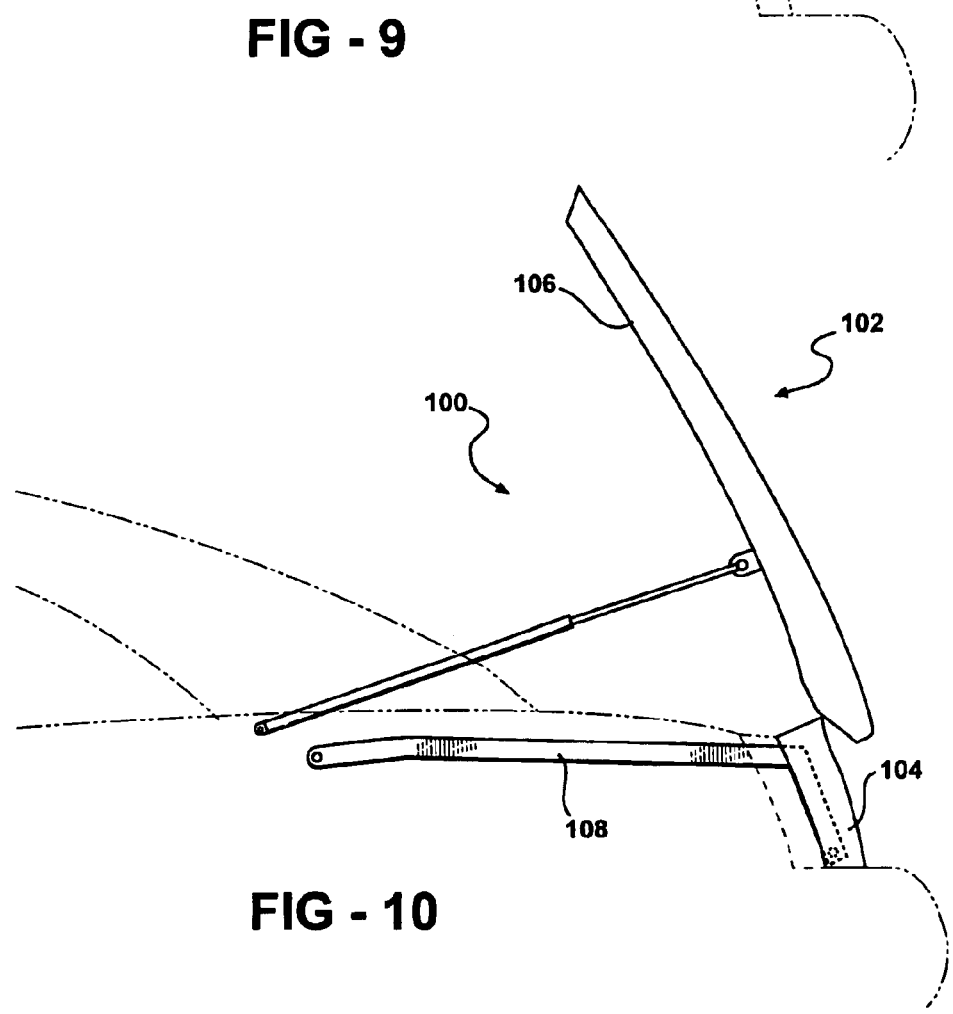
FIG. 10 is a side-elevational view similar to FIGS. 8 and 9, with the decklid system shown in a top receiving position.

Referring now to FIGS. 8–10, a third embodiment of an articulating decklid system according to the present invention is generally shown at 100. This embodiment is very similar to the FIGS. of 5–7, except the decklid 102 is two pieces rather than one. A rearward piece 104 defines the rear portion of the decklid 102 and a forward portion 106 defines the forward part. The portions 104 and 106 are pivotally interconnected to each other and the rearward portion 104 is preferably connected rigidly to the rearward end of the first linkage member 108. Therefore, as the decklid system 100 moves from the closed position of FIG. 8 to either the luggage receiving position of FIG. 9 or the top receiving position of FIG. 10, the forward portion 106 of the decklid pivots relative to the rearward portion 104, rather than the entire decklid pivoting relative to the first linkage member 108. As will be clear to those of skill in the art, the first linkage member 108 and the rear portion 104 of the decklid may be formed together, or rigidly interconnected. Also, the rearward portion 104 may form, or replace, the transversely extending connection portion of the member 108. As is also clear to those of skill in the art, the two-piece decklid design of FIGS. 8–10 may be applied to the first embodiment of the present invention, shown in FIGS. 1–4.

As a further alternative to the various designs present herein, the illustrated actuators may be altered or repositioned. For example, in the embodiment of FIGS. 1–4, the actuators 56 and 60 can be repositioned such that they are behind the second linkage assemblies. In this case, they would be in the extended position when the decklid is closed and in a retracted position when the decklid is in the top receiving position. The actuators could then be locked in the extended position to hold the decklid in the closed position. In this alternative, preferably one end of the actuators is connected to the lower link of each of the second linkage assemblies and the other end is connected to the vehicle body. They could alternatively have their second ends connected to the first linkage member 22. In this case, the actuator would be retracted in both the top receiving and luggage receiving positions to articulate the decklid as shown in the figures. It was previously mentioned that the actuators may be locked in the shortened position. In the earlier embodiment or the presently discussed alternative, the actuators may include the ability to be locked in other positions, such as being lockable in both an extended and retracted position, and/or also be lockable in intermediate positions. As will be clear to those of skill in the art, the various linkages illustrated may be reconfigured without departing from the scope of the invention. For example, the links forming the second linkage assembly may be shorter or longer, or attached in other positions. The other linkage positions and sizes and actuator positions and sizes may also be altered without departing from the scope of the present invention.

The above-described embodiments of the present invention may be altered in various ways without departing from the scope or teaching of the present invention. It is the following claims, including all equivalents, which define the scope of the present invention.

I claim:

1. An articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising:

a first linkage member having a forward end pivotally interconnected with the vehicle body and a rearward end spaced therefrom;

a decklid having a forward end and a rearward end, the rearward end being pivotally interconnected with the rearward end of the first linkage member;

a second linkage assembly having an upper end pivotally interconnected with the decklid and a lower end pivotally interconnected with the first linkage member between the forward and rearward ends, the second linkage assembly having a folded position wherein the upper end and the lower end are separated by a first distance and an unfolded position wherein the upper and lower ends are separated by a distance greater than the first distance;

an actuator;

the decklid system having a first closed position wherein the rearward ends of the first linkage member and the decklid are adjacent the rearward end of the luggage compartment, the second linkage assembly is in the folded position, and the forward end of the decklid is adjacent the forward end of the luggage compartment;

the decklid system having a second top receiving position wherein rearward ends of the first linkage member and the decklid are adjacent the rearward end of the luggage compartment, the second linkage assembly is in the unfolded position, and the forward end of the decklid is spaced from the vehicle body so as to define a generally forward facing opening to receive the retractable roof therethrough; and the decklid system having a third luggage receiving position wherein the rearward ends of the first linkage member and the decklid are spaced from the rearward end of the luggage compartment so as to define a generally rearward facing opening to receive luggage therethrough, the second linkage assembly is in the unfolded position, and the forward end of the decklid is spaced from the forward end of the luggage compartment.

2. The articulating decklid system according to claim 1, wherein the pivotal interconnection between the forward end of the first linkage member and the vehicle body is adjacent the forward end of the luggage compartment.

3. The articulating decklid system according to claim 1, further comprising a latch for selectively latching the first linkage member to the body, the first linkage member being latched to the vehicle body when the decklid system is in the closed position and in the top receiving position.

4. The articulating decklid system according to claim 3, wherein the latch interconnects the rearward end of the first linkage member with the vehicle body.

5. The articulating decklid system according to claim 1, wherein the second linkage assembly comprises an upper link and a lower link, the lower link having a first end pivotally interconnected to the first linkage member and a second end spaced therefrom, the upper link having a first end pivotally interconnected with the second end of the first linkage member and a second end pivotally interconnected with the decklid.

6. The articulating decklid system according to claim 5, wherein the actuator comprises a linear actuator having a first end pivotally interconnected with the vehicle body and the second end pivotally interconnected with the lower link of the second linkage assembly between the first and second ends of the lower link.

7. The articulating decklid system according to claim 1, wherein the actuator comprises a linear actuator having a first end pivotally interconnected with the vehicle body and a second end pivotally interconnected with the second linkage assembly between the upper and lower ends.

8. The articulating decklid system according to claim 7, wherein the actuator has a retracted position and an extended position wherein the ends are farther apart than in the retracted position, the actuator being in the retracted position when the decklid system is in the closed position and when the decklid system is in the luggage receiving position.

9. The articulating decklid system according to claim 8, wherein the actuator and the second linkage assembly are configured such that as the decklid moves between the closed position and the luggage receiving position, the actuator causes the second linkage assembly to move to the unfolded position.

10. The articulating decklid system according to claim 8, wherein the actuator is lockable in the retractable position, the actuator being locked in the retracted position when the decklid system is in the closed position, the locked actuator serving as the only latch for retaining the forward end of the decklid adjacent the forward end of the luggage compartment when the decklid system is in the closed position.

11. The articulating decklid system according to claim 7, wherein the pivotal interconnection between the first end of the actuator and the vehicle body is disposed forward of the pivotal interconnection between the forward end of the first linkage member and the vehicle body.

12. The articulating decklid system according to claim 1, wherein the pivotal connection between the rearward end of the first linkage member and the decklid defines a first pivot axis, the upper end of second linkage assembly being connected to the decklid forward of the first pivot axis.

13. The articulating decklid system according to claim 1, wherein the first linkage member includes a pair of spaced apart side portions each having a forward end and a rearward end, the linkage member further including a connecting portion extending between and interconnecting the rearward ends of the side portions, the forward ends of the side portions defining the forward end of the first linkage member and the connecting portion defining the rearward end of the first linkage member.

14. The articulating decklid system according to claim 13, wherein the luggage compartment has a pair of opposed sides extending between the forward and rearward ends, the side portions of the first linkage member being adjacent the sides of the luggage compartment.

15. The articulating decklid system according to claim 1, further comprising a third linkage assembly, the lower end of the second linkage assembly being pivotally interconnected with one of the side portions of the first linkage member, the third linkage assembly having an upper end pivotally interconnected with the decklid and a lower end pivotally interconnected with the other side portion of the first linkage member.

16. An articulating decklid system for a vehicle having a body and a retractable roof selectively covering a passenger compartment disposed in the body, the vehicle further having a luggage storage compartment positioned rearward of the passenger compartment and disposed in the body, the luggage compartment having a forward end and a rearward end, the system comprising:

a first linkage member having a forward end pivotally interconnected with the vehicle body and a rearward end spaced therefrom;

a decklid having a forward end and a rearward end, the rearward end being pivotally interconnected with the rearward end of the first linkage member so as to define a first pivot axis;

an actuation mechanism at least partially disposed adjacent the forward end of the luggage compartment, the mechanism having a first end and a second end, the first end being interconnected with the decklid forward of the first pivot axis, the actuation mechanism having a retracted position wherein the first end and the second end are separated by a first distance and an extended position wherein the first and second ends are separated by a distance greater than the first distance;

the decklid system having a first closed position wherein the rearward ends of the first linkage member and the decklid are adjacent the rearward end of the luggage compartment, the actuation mechanism is in the retracted position, and the forward end of the decklid is adjacent the forward end of the luggage compartment;

the decklid system having a second top receiving position wherein rearward ends of the first linkage member and the decklid are adjacent the rearward end of the luggage compartment, the actuation mechanism is in the extended position, and the forward end of the decklid is spaced from the vehicle body so as to define a generally forward facing opening to receive the retractable roof therethrough; and the decklid having a third luggage receiving position wherein the rearward ends of the first linkage member and the decklid are spaced from the rearward end of the luggage compartment so as to define a generally rearward facing opening to receive luggage therethrough.

17. The articulating decklid system according to claim 16, wherein the second end of the actuation mechanism is pivotally interconnected with the first linkage member between the forward and rearward ends, the actuation mechanism being in the extended position when the decklid system is in the luggage receiving position.

18. The articulating decklid system according to claim 16, wherein the second end of the actuation mechanism is pivotally interconnected with the vehicle body, the second end being disposed forward of the first end, the actuation mechanism being in the retracted position when the decklid is in the luggage receiving position.

19. The articulating decklid system according to claim 16, wherein the pivotal interconnection between the forward end of the first linkage member and the vehicle body is adjacent the forward end of the luggage compartment.

20. The articulating decklid system according to claim 16, further comprising a latch for selectively latching the first linkage member to the body, the first linkage member being latched to the vehicle body when the decklid system is in the closed position and in the top receiving position.

21. The articulating decklid system according to claim 20, wherein the latch interconnects the rearward end of the first linkage member with the vehicle body.

22. The articulating decklid system according to claim 16, wherein the actuation mechanism comprises a linear actuator, the actuator having a retracted position and an extended position wherein the ends are farther apart than in the retracted position, the actuator being in the retracted position when the decklid system is in the closed position and when the decklid system is in the luggage receiving position.

23. The articulating decklid system according to claim 22, wherein the pivotal interconnection between the first end of the actuator and the vehicle body is disposed forward of the pivotal interconnection between the forward end of the first linkage member and the vehicle body.

24. A system for articulating a cover member for selectively covering an opening in a body of a vehicle, the opening in the body having a forward end and a rearward end, the system comprising:

a cover member having a forward end and a rearward end, the cover member having a closed position where the forward end is adjacent the forward end of the opening and the rearward end is adjacent the rearward end of the opening;

an articulation mechanism movably supporting the cover member such that the cover member is movable to a first open position wherein the forward end of the cover is spaced from the forward end of the opening and to a second open position wherein the rearward end is spaced from the rearward end of the opening, the articulation mechanism including an actuator having a pair of spaced apart ends, the actuator having a retracted position and an extended position, with the ends being farther apart in the extended position than in the retracted position, the actuator moving from the retracted position to the extended position when the cover member moves from the closed position to one of the open positions, the actuator being maintainable in the retracted position to serve as a linkage that moves with and defines movement of the cover member between the closed position and the other of the open positions, one of the ends of the actuator being pivotally interconnected with the vehicle body at a fixed position that does not move relative to the body when the cover member moves between the closed position and either of the open positions.

25. The system according to claim 24, wherein the cover member is a decklid.

26. The system according to claim 24, wherein the other of the ends of the actuator is pivotally interconnected with the cover member.

27. The system according to claim 26, wherein the articulation mechanism further comprises a linkage member having a forward end pivotally interconnected with the vehicle body and a rearward end pivotally interconnected with the rearward end of the cover member.

28. The system according to claim 27, wherein the pivotal interconnection between the forward end of the linkage member and the vehicle body is adjacent the forward end of the opening in the body.

29. The system according to claim 27, further comprising a latch for selectively latching the linkage member to the body, the linkage member being latched to the vehicle body when the cover member is in the closed position and in one of the open positions.

30. The system according to claim 29, wherein the latch interconnects the rearward end of the linkage member with the vehicle body.

31. The system according to claim 27, wherein the pivotal interconnection between the actuator and the vehicle body is disposed forward of the pivotal interconnection between the forward end of the linkage member and the vehicle body.

32. The system according to claim 26, wherein the end of the actuator interconnected with the cover member is interconnected with the cover member forward of the rearward end of the cover member.

33. The system according to claim 26, wherein the cover member is a two piece decklid with a forward portion pivotally interconnected with a rearward portion.

34. A system for articulating a cover member for selectively covering an opening in a body of a vehicle, the opening in the body having a forward end and a rearward end, the system comprising:
   a cover member having a forward end and a rearward end, the cover member having a closed position where the forward end is adjacent the forward end of the opening and the rearward end is adjacent the rearward end of the opening;
   an articulation mechanism movably supporting the cover member such that the cover member is movable to a first open position wherein the forward end of the cover member is spaced from the forward end of the opening and to a second open position wherein the rearward end is spaced from the rearward end of the opening, the articulation mechanism including an actuator having a pair of spaced apart ends, the actuator having a retracted position and an extended position, with the ends being farther apart in the extended position than in the retracted position, the actuator moving from the retracted to the extended position when the cover member moves from the closed position to one of the open positions, the actuator being in the retracted position and serving as a linkage when the cover member moves from the closed position to the other of the open positions, the articulation mechanism further including a first linkage member having a forward end pivotally interconnected with the vehicle body and a rearward end pivotally interconnected with the cover member.

35. The system according to claim 34, wherein the rearward end of the first linkage is pivotally interconnected with the cover member adjacent the rearward end of the cover member.

36. The system according to claim 34, wherein the articulation mechanism further comprises a second linkage assembly having an upper end pivotally interconnected with the cover member and a lower end pivotally interconnected with the first linkage member between the forward and rearward ends, the second linkage assembly having a folded position wherein the upper end and the lower end are separated by a first distance and an unfolded position wherein the upper and lower ends are separated by a distance greater than the first distance.

37. The system according to claim 34, wherein the second linkage assembly comprises an upper link and a lower link, the lower link having a first end pivotally interconnected to the first linkage member and a second end spaced therefrom, the upper link having a first end pivotally interconnected with the second end of the first linkage member and a second end pivotally interconnected with the cover member, the actuator has one end pivotally interconnected with the vehicle body and the other end pivotally interconnected with second linkage assembly.

38. A system for articulating a cover member for selectively covering an opening in a body of a vehicle, the opening in the body having a forward end and a rearward end, the system comprising:
   a cover member having a forward end and a rearward end, the cover member having a closed position where the forward end is adjacent the forward end of the opening and the rearward end is adjacent the rearward end of the opening;
   an articulation mechanism movably supporting the cover member such that the cover member is movable to a first open position wherein the forward end of the cover member is spaced from the forward end of the opening and to a second open position wherein the rearward end is spaced from the rearward end of the opening, the articulation mechanism including an actuator having a pair of spaced apart ends, the actuator having a first position and a second position, with the ends being farther apart in the one of the positions than in the other position, the actuator moving from the first position to the second position when the cover member moves from the closed position to one of the open positions, the actuator being maintainable in the first position to serve as a linkage that moves with and defines movement of the cover member between the closed position and the other of the open positions, one of the ends of the actuator being pivotally interconnected with the vehicle body at a fixed position that does not move relative to the body when the cover member moves between the closed position and either of the open positions.

39. The system according to claim 38, wherein the cover member is a decklid.

40. The system according to claim 38, wherein the other of the ends of the actuator is pivotally interconnected with the cover member.

41. The system according to claim 40, wherein the articulation mechanism further comprises a linkage member having a forward end pivotally interconnected with the vehicle body and a rearward end pivotally interconnected with the rearward end of the cover member.

42. The system according to claim 41, wherein the pivotal interconnection between the forward end of the linkage member and the vehicle body is adjacent the forward end of the opening in the body.

43. The system according to claim 41, further comprising a latch for selectively latching the linkage member to the body, the linkage member being latched to the vehicle body when the cover member is in the closed position and in one of the open positions.

44. The system according to claim 43, wherein the latch interconnects the rearward end of the linkage member with the vehicle body.

45. The system according to claim 41, wherein the pivotal interconnection between the actuator and the vehicle body is disposed forward of the pivotal interconnection between the forward end of the linkage member and the vehicle body.

46. The system according to claim 40, wherein the end of the actuator interconnected with the cover member is interconnected with the cover member forward of the rearward end of the cover member.

47. The system according to claim 40, wherein the cover member is a two piece decklid with a forward portion pivotally interconnected with a rearward portion.

48. A system for articulating a cover member for selectively covering an opening in a body of a vehicle, the opening in the body having a forward end and a rearward end, the system comprising:

a cover member having a forward end and a rearward end, the cover member having a closed position where the forward end is adjacent the forward end of the opening and the rearward end is adjacent the rearward end of the opening;

an articulation mechanism movably supporting the cover member such that the cover member is movable to a first open position wherein the forward end of the cover member is spaced from the forward end of the opening and to a second open position wherein the rearward end is spaced from the rearward end of the opening, the articulation mechanism including an actuator having a pair of spaced apart ends, the actuator having a first position and a second position, with the ends being farther apart in the one of the positions than in the other position, the actuator moving from the first position to the second position when the cover member moves from the closed position to one of the open positions, the actuator being in the first position and serving as a linkage when the cover member moves from the closed position to the other of the open positions, the articulation mechanism further including a first linkage member having a forward end pivotally interconnected with the vehicle body and a rearward end pivotally interconnected with the cover member.

49. The system according to claim 48, wherein the rearward end of the first linkage is pivotally interconnected with the cover member adjacent the rearward end of the cover member.

50. The system according to claim 48, wherein the articulation mechanism further comprises a second linkage assembly having an upper end pivotally interconnected with the cover member and a lower end pivotally interconnected with the first linkage member between the forward and rearward ends, the second linkage assembly having a folded position wherein the upper end and the lower end are separated by a first distance and an unfolded position wherein the upper and lower ends are separated by a distance greater than the first distance.

51. The system according to claim 50, wherein the second linkage assembly comprises an upper link and a lower link, the lower link having a first end pivotally interconnected to the first linkage member and a second end spaced therefrom, the upper link having a first end pivotally interconnected with the second end of the first linkage member and a second end pivotally interconnected with the cover member, the actuator has one end pivotally interconnected with the vehicle body and the other end pivotally interconnected with second linkage assembly.

* * * * *